United States Patent
Gu et al.

(10) Patent No.: US 11,577,993 B2
(45) Date of Patent: Feb. 14, 2023

(54) THERMAL INSULATING GLASS, METHOD FOR PREPARING THE SAME AND THERMAL INSULATING GLASS PRODUCT

(71) Applicant: SAINT-GOBAIN GLASS FRANCE, Courbevoie (FR)

(72) Inventors: Yunxin Gu, Shanghai (CN); Ce Shi, Shanghai (CN); Chong Zhou, Shanghai (CN)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 288 days.

(21) Appl. No.: 16/958,595

(22) PCT Filed: Dec. 25, 2018

(86) PCT No.: PCT/CN2018/123396
§ 371 (c)(1),
(2) Date: Jun. 26, 2020

(87) PCT Pub. No.: WO2019/128969
PCT Pub. Date: Jul. 4, 2019

(65) Prior Publication Data
US 2020/0354265 A1    Nov. 12, 2020

(30) Foreign Application Priority Data
Dec. 29, 2017    (CN) .......................... 201711477227.5

(51) Int. Cl.
*B32B 15/04*    (2006.01)
*B32B 17/06*    (2006.01)
(Continued)

(52) U.S. Cl.
CPC ...... *C03C 17/3417* (2013.01); *C03C 17/3441* (2013.01); *C03C 27/06* (2013.01);
(Continued)

(58) Field of Classification Search
CPC .................................................. C03C 2217/23
(Continued)

(56) References Cited

U.S. PATENT DOCUMENTS 8,986,851 B2 * 3/2015 Fu ........................ B05D 3/0272
                                                    252/519.1
9,079,480 B1    7/2015 Williams
(Continued)

FOREIGN PATENT DOCUMENTS

CN    1230163 A    9/1999
CN    102145980 A    8/2011
(Continued)

OTHER PUBLICATIONS

Second Office Action as issued in Chinese Patent Applicatin No. 201711477227.5, dated Feb. 8, 2022.
(Continued)

*Primary Examiner* — Lauren R Colgan
(74) *Attorney, Agent, or Firm* — Pillsbury Winthrop Shaw Pittman LLP

(57) ABSTRACT

A thermal insulating glass includes a glass substrate and a thermal insulating layer. The thermal insulating layer includes composite tungsten oxide and a binder. The composite tungsten oxide is represented by formula (1): $M_xWO_{3-y}A_y$, (1), where M is an alkali metal element or an alkaline earth metal element, W is tungsten, O is oxygen, A is a halogen element, and $0<x\leq1$ and $0\leq y\leq0.5$. And the binder includes one or more of the following components: silicon dioxide, titanium dioxide, and aluminium oxide. The thermal insulating glass can prevent the occurrence of obscuration. The thermal insulating has infrared reflectivity, high strength and good wear resistance, and can effectively resist high temperature and strong oxidation environment.

15 Claims, 3 Drawing Sheets

(51) Int. Cl.
*C03C 17/34* (2006.01)
*C03C 27/06* (2006.01)
*C03C 17/02* (2006.01)

(52) U.S. Cl.
CPC ........ *C03C 17/02* (2013.01); *C03C 2217/213* (2013.01); *C03C 2217/23* (2013.01); *C03C 2217/425* (2013.01); *C03C 2217/45* (2013.01); *C03C 2217/478* (2013.01)

(58) Field of Classification Search
USPC .................................................. 428/428, 432
See application file for complete search history.

(56) References Cited

U.S. PATENT DOCUMENTS

| | | | | |
|---|---|---|---|---|
| 9,312,490 | B2* | 4/2016 | Choi | H01L 51/0096 |
| 9,359,506 | B1* | 6/2016 | Su | C09D 7/67 |
| 9,434,652 | B2* | 9/2016 | Chen | C04B 35/62218 |
| 2010/0237644 | A1 | 9/2010 | Senge | |
| 2011/0143116 | A1* | 6/2011 | Chung | C03C 17/25 |
| | | | | 252/519.1 |
| 2011/0297899 | A1* | 12/2011 | Tofuku | C09D 5/32 |
| | | | | 252/587 |
| 2014/0028048 | A1 | 1/2014 | Kornexl | |
| 2014/0187701 | A1* | 7/2014 | Chung | C08L 23/0853 |
| | | | | 524/406 |
| 2014/0242381 | A1* | 8/2014 | Fu | C03C 17/3447 |
| | | | | 428/428 |
| 2015/0153478 | A1* | 6/2015 | Takeda | H01B 1/20 |
| | | | | 427/126.3 |
| 2015/0217540 | A1* | 8/2015 | Keller | B32B 17/10605 |
| | | | | 428/323 |
| 2016/0339676 | A1* | 11/2016 | Keller | B32B 17/10605 |
| 2019/0283366 | A1* | 9/2019 | Keller | B32B 17/1066 |

FOREIGN PATENT DOCUMENTS

| | | |
|---|---|---|
| CN | 101652260 B | 5/2012 |
| CN | 102781868 A | 11/2012 |
| CN | 101754843 B | 6/2013 |
| CN | 103864313 A | 6/2014 |
| CN | 104828868 A | 8/2015 |
| CN | 105984190 A | 10/2016 |
| CN | 106987205 A | 7/2017 |
| CN | 107189501 A | 9/2017 |
| CN | 207128588 U | 3/2018 |
| CN | 108099554 A | 6/2018 |
| EA | 025305 B1 | 12/2016 |
| JP | H08-112832 A | 5/1996 |
| RU | 2673304 C2 | 11/2018 |
| WO | WO 2015/129758 A1 | 9/2015 |

OTHER PUBLICATIONS

Office Action as issued in Eurasian Patent Application No. 201990444, dated Dec. 17, 2021.
First Examination Report as issued in Indian Patent Application No. 202017018647, dated Jan. 3, 2022.
Office Action and Search Report as issued in Russian Patent Application No. 2021120395, dated Dec. 20, 2021.
Office Action and Search Report as issued in Russian Patent Application No. 2021121577, dated Dec. 20, 2021.
International Search Report as issued in International Patent Application No. PCT/CN2018/123396, dated Apr. 8, 2019.

* cited by examiner

THERMAL INSULATING GLASS, METHOD FOR PREPARING THE SAME AND THERMAL INSULATING GLASS PRODUCT

CROSS-REFERENCE TO RELATED APPLICATIONS

This application is the U.S. National Stage of PCT/CN2018/123396, filed Dec. 25, 2018, which in turn claims priority to Chinese patent application number 201711477227.5 filed Dec. 29, 2017. The content of these applications are incorporated herein by reference in their entireties.

RELATED FIELD

The present disclosure relates to a thermal insulating glass, a method for preparing the thermal insulating glass and a thermal insulating glass product.

BACKGROUND

At present, in the field of thermal insulating glass, cesium tungsten bronze ($Cs_xWO_3$) is one of the most promising materials, since it can achieve good effect of thermal insulation and has a low cost. The thermal insulating glass based on the cesium tungsten bronze material has been commercially available. However, the existing thermal insulating glass can not be used in a hot bending process. The main problem is that the existing thermal insulating glass can hardly withstand high temperature and strong oxidation environment during the hot bending process. Moreover, the existing thermal insulating glass may become obscure due to the migration of sodium-ions from the base glass. In addition, the existing thermal insulating glass has poor wear resistance (for example, can not withstand the friction in the washing process).

The patent application published as No. CN103864313A discloses a thermal insulating glass having an infrared reflective multilayer structure. The thermal insulating glass includes a transparent substrate, a barrier layer and a thermal insulating layer. The barrier layer is positioned on the transparent substrate and includes tungsten oxide-containing silicon dioxide, titanium dioxide and aluminium oxide or a combination thereof. The thermal insulating layer is positioned on the barrier layer and composed of a composite tungsten oxide. This patent application also discloses a method for manufacturing the thermal insulating glass having an infrared reflective multilayer structure.

In an existing scheme in which cesium tungsten bronze is used as a thermal insulating layer, cesium tungsten bronze precursor and reducing gas (such as $N_2$, Ar, and $H_2$) are typically used. However, in an actual hot bending or tempering process, the scheme in which cesium tungsten bronze precursor and reducing gas are adopted can not be realized.

SUMMARY

It is an object of the present disclosure to overcome the above defects in the prior art and provide a thermal insulating glass, a method for preparing the thermal insulating glass and a thermal insulating glass product.

According to an aspect of the present disclosure, a thermal insulating glass is provided. The thermal insulating glass comprises: a glass substrate and a thermal insulating layer. The thermal insulating layer comprises composite tungsten oxide and a binder. The composite tungsten oxide is represented by formula (1): $M_xWO_{3-y}A_y$ (1), where M is an alkali metal element or an alkaline earth metal element, W is tungsten, O is oxygen, A is a halogen element, and $0<x\leq1$ and $0\leq y\leq0.5$. And the binder comprises one or more of the following components: silicon dioxide, titanium dioxide, and aluminium oxide.

Further, y=0.

Further, M is cesium.

Further, the thickness of the thermal insulating layer is from 50 nm to 50 μm, preferably from 500 nm to 5 μm, and more preferably 1 μm.

Further, the weight ratio of the binder to the composite tungsten oxide in the thermal insulating layer is from 1:1 to 1:1000, preferably from 1:10 to 1:200, and more preferably 1:100.

Further, the thermal insulating glass further comprises a barrier layer positioned between the glass substrate and the thermal insulating layer.

Preferably, the barrier layer comprises one or more of the following components: silicon dioxide, titanium dioxide, and aluminium oxide. Preferably, the purity of monocomponent silicon dioxide, titanium dioxide, and aluminium oxide is equal to or greater than 99%. Preferably, the dense degree of the barrier layer is equal to or greater than 90%.

Preferably, the thickness of the barrier layer is from 5 nm to 500 nm, preferably from 10 nm to 200 nm, and more preferably 100 nm.

Further, the thermal insulating glass also comprises a protective powder layer positioned on the thermal insulating layer. The protective powder layer comprises one or more of the following components: carbon powder, iron powder, zinc powder, aluminum powder, and reducing salt.

Further, the thickness of the protective powder layer is from 0.01 mm to 5 mm, preferably from 0.1 mm to 1 mm, and more preferably 0.5 mm.

Further, the thermal insulating glass also comprises a protective glass positioned on the protective powder layer.

According to another aspect of the present disclosure, a method for preparing the thermal insulating glass is provided. The method comprises the following steps:

(a) providing a glass substrate;
(a1) optionally, providing a barrier layer on the glass substrate;
(b) providing a thermal insulating layer on the glass substrate or on the barrier layer;
(c) optionally, providing a protective powder layer on the thermal insulating layer;
(d) optionally, providing a protective glass on the protective powder layer.

According to still another aspect of the present disclosure, a thermal insulating glass product comprising the above thermal insulating glass is provided.

The positive effect of the present disclosure is that the thermal insulating glass according to the present disclosure can effectively block sodium-ions from the glass substrate, such that damage to lattice structure due to sodium-ion migration effect can be effectively avoided and the occurrence of obscuration can be prevented. Moreover, the thermal insulating glass has infrared reflectivity, high strength and good wear resistance, and can effectively resist the friction in the washing process. Moreover, the thermal insulating glass of the present disclosure can be applied in a hot bending or tempering process and can effectively resist high temperature and strong oxidation environment in the hot bending or tempering process.

BRIEF DESCRIPTION OF THE DRAWINGS

The foregoing and other aspects of the present application will be more completely understood from after mentioned detailed description with reference to the accompanying drawings. It should be noted that, the drawings may not be drawn to scale for the purpose of clarity, but this does not affect the understanding of the present application. In the drawings.

DETAILED DESCRIPTION

General Definitions and Terms

Figure 1:
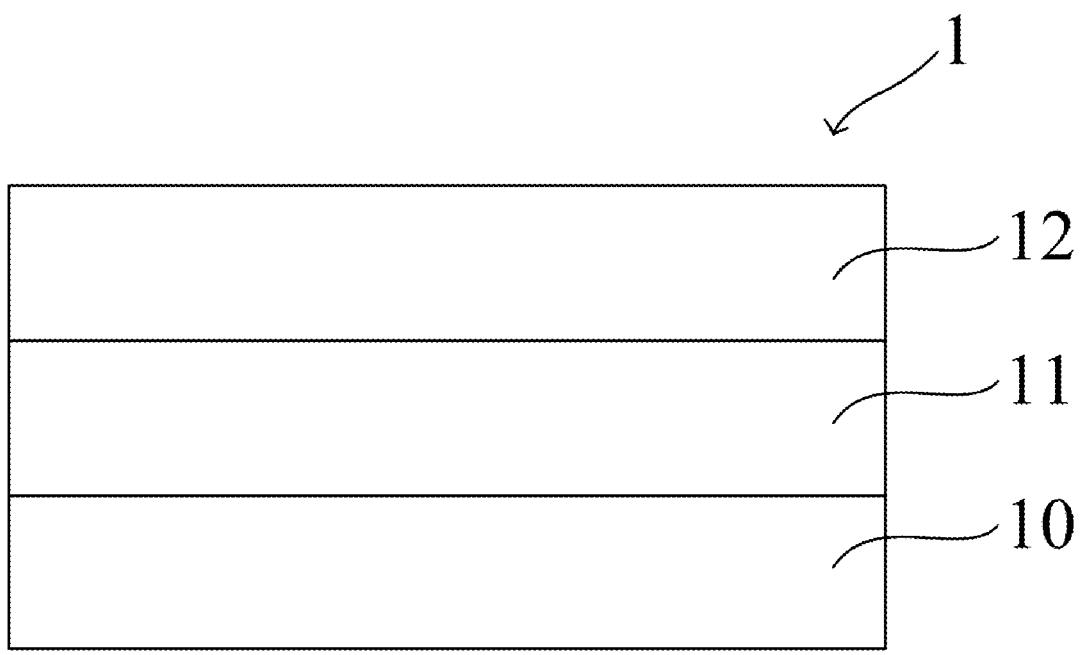
FIG. 1 is a schematic structure view showing a thermal insulating glass of Embodiment 1 of the present disclosure.

Unless otherwise indicated, all publications, patent applications, patents, and other references mentioned herein are incorporated herein by reference in their entirety.

Unless otherwise defined, all technical and scientific terms used herein have the same meaning as commonly understood by one having ordinary skill in the art to which this invention belongs. In case of conflict, definitions in present specification are followed.

Except where expressly noted, trademarks are shown in superscript.

Unless otherwise stated, all percentages, parts, ratios, etc., are by weight.

When an amount, concentration, or other value or parameter is given as either a range, a preferred range or a preferred upper limit value and a preferred lower limit value, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention is limited to the specific values recited when a range is defined.

When the term "about" is used in describing a value or an end-point of a range, the disclosure should be understood to include the specific value or end-point referred to.

As used herein, the terms "include", "comprise", "have" or any other variation thereof, are intended to cover a non-exclusive inclusion. For example, a composition, process, method, article, or apparatus that includes a list of elements is not necessarily limited to include only those elements but may include other elements not expressly listed or inherent to such composition, process, method, article, or apparatus.

Also, the indefinite articles "a" and "an" preceding an element or component of the invention are intended to be nonrestrictive regarding the number of instances (i.e. occurrences) of the element or component. Therefore "a" or "an" should be read to include one or at least one, and the singular word form of the element or component also includes the plural unless the number is obviously meant to be singular.

"Optional" or "optionally" as used herein means that the subsequently described event or circumstance may or may not occur, and that the description includes instances where the event or circumstance occurs and instances where it does not.

The term "one or more" or "at least one" as used herein means one, two, three, four, five, six, seven, eight or more.

"Glass" in the term "glass substrate" as used herein is an amorphous inorganic non-metallic material, typically made from various inorganic minerals (e.g., quartz sand, borax, boric acid, barite, barium carbonate, limestone, feldspar, sodium carbonate, etc.) as the main raw materials and a small amount of auxiliary raw materials, and its main components are silicon dioxide and other oxides. The "glass" here may be ordinary glass whose chemical composition is $Na_2SiO_3$, $CaSiO_3$, $SiO_2$ or $Na_2O \cdot CaO \cdot 6SiO_2$, etc., and whose main component is silicate double salt (an amorphous solid with an irregular structure). The "glass" here may also be colored glass into which certain metal oxides or salts are mixed to exhibit colors, or tempered glass obtained by a physical or chemical method.

The term "reducing salt" as used herein refers to salt having reducibility, and an example thereof is sulfite.

The term "protective powder layer" as used herein refers to a layer formed from powders having a protective effect.

The term "protective glass" as used herein refers to glass having a protective effect. The meaning of "glass" in "protective glass" is consistent with the meaning of "glass" in "glass substrate".

The term "dense degree" as used herein refers to the ratio of the volume of the solid matter portion to the total volume of the material. That is, dense degree=$(\rho_0/\rho) \times 100\%$ ($\rho_0$: apparent density; $\rho$: density).

Thermal Insulating Glass

The present disclosure relates to a thermal insulating glass including a glass substrate and a thermal insulating layer.

In an implementation of the present disclosure, the thermal insulating layer in the thermal insulating glass of the present disclosure includes composite tungsten oxide and a binder.

In a specific implementation, the composite tungsten oxide is represented by formula (1):

$$M_xWO_{3-y}A_y \qquad (1),$$

where M is an alkali metal element or an alkaline earth metal element, W is tungsten, O is oxygen, A is a halogen element, and $0<x\leq1$ and $0\leq y\leq0.5$.

M is an alkali metal element or an alkaline earth metal element, and examples thereof are lithium (Li), sodium (Na), potassium (K), rubidium (Rb), cesium (Cs), beryllium (Be), magnesium (Mg), calcium (Ca), strontium (Sr), barium (Ba) or any combination thereof. A is a halogen element, and examples thereof are fluorine (F), chlorine (Cl), bromine (Br), iodine (I) or any combination thereof.

In a further implementation, the composite tungsten oxide is represented by formula (2),

$$M_xWO_3 \qquad (2),$$

where M, x, W and O are as defined above.

Formula (2) represents the case when y=0 in the formula (1), that is, the case where the composite tungsten oxide does not include a halogen element. Thus, in a preferred implementation, the composite tungsten oxide is represented by the formula (1), where y=0 and M is cesium.

The composite tungsten oxide used in the present disclosure is commercially available, for example, from Sumitomo Metal Industries, Ltd.

The binder includes one or more of the following components: silicon dioxide, titanium dioxide, and aluminium oxide.

The thickness of the thermal insulating layer is from 50 nm to 50 μm, preferably from 500 nm to 5 μm, and more preferably 1 μm.

The weight ratio of the binder to the composite tungsten oxide in the thermal insulating layer is from 1:1 to 1:1000, preferably from 1:10 to 1:200, and more preferably 1:100.

The composite tungsten oxide material is a thermal insulating material having infrared reflectivity, so that infrared rays can be effectively reflected by the thermal insulating layer. In addition, the binder can bond the composite tungsten oxide together, thereby effectively increasing the wear resistance of the thermal insulating layer.

Barrier Layer: in an implementation of the present disclosure, the thermal insulating glass of the present disclosure further includes a barrier layer positioned between the glass substrate and the thermal insulating layer.

The barrier layer includes one or more of the following components: silicon dioxide, titanium dioxide, and aluminium oxide. The purity of monocomponent silicon dioxide, titanium dioxide, and aluminium oxide is equal to or greater than 99%. The dense degree of the barrier layer is equal to or greater than 90%.

The thickness of the barrier layer is from 5 nm to 500 nm, preferably from 10 nm to 200 nm, and more preferably 100 nm.

Sodium-ions from the glass substrate can be effectively blocked by the barrier layer, such that damage to lattice structure due to sodium-ion migration effect can be effectively avoided and the glass can be prevented from being obscured.

Protective powder layer: in a further implementation of the present disclosure, the thermal insulating glass of the present disclosure further includes a protective powder layer positioned on the thermal insulating layer.

The protective powder layer includes one or more of the following components: carbon powder, iron powder, zinc powder, aluminum powder, and reducing salt. Examples of the reducing salt include, but are not limited to, sulfite.

The thickness of the protective powder layer is from 0.01 mm to 5 mm, preferably from 0.1 mm to 1 mm, and more preferably 0.5 mm.

These reducing materials do not react with the materials of the thermal insulating layer and can provide protective effect. Especially, during the hot bending process, the protective powder layer can effectively prevent the surface of the thermal insulating glass from being oxidized.

Protective glass: in a still further implementation, the thermal insulating glass of the present disclosure further includes a protective glass positioned on the protective powder layer.

The protective glass can also effectively prevent the surface of the thermal insulating glass from being oxidized and provide better protection for the thermal insulating glass.

Method for Preparing the Thermal Insulating Glass

In another aspect, the present disclosure also relates to a method for preparing the thermal insulating glass of the present disclosure. The method includes the following steps:

(a) providing a glass substrate;

(b) providing a thermal insulating layer on the glass substrate.

Step (a)

In the step (a), the glass substrate is used as a basis for the thermal insulating glass.

Step (a1)

Optionally, prior to step (b), the preparation method of the present disclosure further includes a step (a1) of providing a barrier layer on the glass substrate. In the step (a1), a solution for the barrier layer is coated on the surface of the glass substrate and dried to form the barrier layer. The coating process is preferably performed by a roll coating method.

Preferably, the solution for the barrier layer includes one or more of the following components: silicon dioxide, titanium dioxide, and aluminium oxide. The purity of monocomponent silicon dioxide, titanium dioxide, and aluminium oxide is equal to or greater than 99%. The dense degree of the formed barrier layer is equal to or greater than 90%.

In a specific implementation, in the step (a1), the solution for the barrier layer is a solution of the corresponding component. When silicon dioxide is used, a silicon dioxide solution may be adopted. The silicon dioxide solution is obtained by the following preparation method: tetraethyl orthosilicate is mixed with hydrochloric acid and they are stirred; the weight ratio of tetraethyl orthosilicate to hydrochloric acid is from 5:1 to 1:50; and the stirring temperature is from 15 to 25° C. and the stirring time is from 4 to 10 hours. In the step (a1), the drying temperature is from 80 to 200° C. and the drying time is from 3 s to 60 s. During coating, the speed of the conveyor belt is from 5 to 15 m/min and the speed of the rubber roller is from 5 to 15 m/min.

Step (b)

In the step (b), the thermal insulating layer is provided on the glass substrate. That is, a mixed solution of a composite tungsten oxide solution and a binder solution is coated on the surface of the glass substrate and dried to form the thermal insulating layer. The coating process is preferably performed by a roll coating method.

If the method of the present disclosure includes the step (a1), the step (b) is as follows: a mixed solution of a composite tungsten oxide solution and a binder solution is coated on the surface of the barrier layer and dried to form the thermal insulating layer.

In a specific implementation, in the step (b), the binder solution is a solution of the corresponding component. When silicon dioxide is used, a silicon dioxide solution may be adopted. The silicon dioxide solution is mixed with the composite tungsten oxide solution. The solid content of the composite tungsten oxide solution is from 5 to 50%. The weight ratio of silicon dioxide to composite tungsten oxide is from 1:1 to 1:1000, preferably from 1:10 to 1:200, and more preferably 1:100. In the step (b), the drying temperature is from 80 to 200° C., and the drying time is from 3 s to 60 s. During coating, the speed of the conveyor belt is from 5 to 15 m/min and the speed of the rubber roller is from 5 to 15 m/min.

After the step (b), the method of the present disclosure optionally includes a step (c) of providing a protective powder layer on the thermal insulating layer.

For example, protective powder may be sprinkled by hand, or be dispersed in a solvent (such as water and ethanol) and sprayed on the surface of the thermal insulating layer.

After the step (c), the method of the present disclosure optionally includes a step (d) of providing a protective glass on the protective powder layer.

In other implementations, the coating process described above can be performed by methods other than the roll coating method. For example, the method of spin coating, casting, bar coating, blade coating, wire bar coating, or dip coating may be employed.

It should be noted that, although the barrier layer is described as being positioned on the glass substrate in the above implementations, the description only indicates the positional relationship between the barrier layer and the glass substrate. The barrier layer may be disposed in contact with the surface of the glass substrate. Other layers may also be provided between the barrier layer and the glass substrate. Also, although the thermal insulating layer is described as being positioned on the barrier layer, other layers may also be provided between the thermal insulating layer and the barrier layer.

Beneficial Effects

The thermal insulating glass of the present disclosure can effectively block sodium-ions from the glass substrate, such that damage to lattice structure due to sodium-ion migration effect can be effectively avoided and the glass can be prevented from being obscured. Moreover, the thermal insulating glass has infrared reflectivity, high strength and good wear resistance, and can effectively resist the friction in the washing process. Moreover, the thermal insulating glass of the present disclosure can be applied in a hot bending or tempering process and can effectively resist high temperature and strong oxidation environment in the hot bending or tempering process.

EMBODIMENT

The following specific embodiments are illustrative of the thermal insulating glass and the method for preparing the thermal insulating glass according to the present disclosure, and are not meant to limit the present disclosure.

Main reagents:

Tetraethyl orthosilicate (TEOS) purchased from Sinopharm Group Chemical Reagent Co., Ltd (Cat. No. 80124118)

Cesium tungsten bronze purchased from Sumitomo Metal Industries, Ltd

Main instrument:

A roll coating equipment purchased from Shanghai Mingshuo Machinery Co., Ltd

Embodiment 1

First applying step:

Tetraethyl orthosilicate (TEOS) is mixed with hydrochloric acid (HCl) with a pH of 2 to prepare a silicon dioxide solution. TEOS and hydrochloric acid are each 2 kg, and they are stirred at room temperature (25° C.) for 4 hours.

The silicon dioxide solution is applied on the glass substrate by roll coating. The purity of the silicon dioxide is 99%. The speed of the conveyor belt is 10 m/min and the speed of the rubber roller is 12 m/min. After the silicon dioxide solution has been applied on the glass substrate, they are dried at a temperature of 100° C. for 10 s to form a barrier layer. The dense degree of the barrier layer is 90%. The thickness of the barrier layer is 100 nm.

Second Applying Step:

The silicon dioxide solution is mixed with a cesium tungsten bronze solution. The solid content of the cesium tungsten bronze solution is 20%. The weight ratio of silicon dioxide to cesium tungsten bronze in the mixed solution is 1:100.

The mixed solution is applied on the barrier layer positioned on the glass substrate by roll coating. The speed of the conveyor belt is 14 m/min and the speed of the rubber roller is 14 m/min. After the mixed solution has been applied on the barrier layer, they are dried at a temperature of 100° C. for 20 s to form a thermal insulating layer. The thickness of the thermal insulating layer is 1 µm.

A thermal insulating glass of Embodiment 1 is obtained by the above method, and the thermal insulating glass includes a glass substrate 10, a barrier layer 11 positioned on the glass substrate 10 and a thermal insulating layer 12 positioned on the barrier layer 11 (see FIG. 1).

Embodiment 2

On the basis of Embodiment 1, a protective powder layer is provided on the thermal insulating layer of the thermal insulating glass, and the protective powder layer includes carbon powder. The protective powder is dispersed in water and sprayed on the surface of the thermal insulating layer. The thickness of the protective powder layer is 0.5 mm.

Embodiment 3

Figure 2:
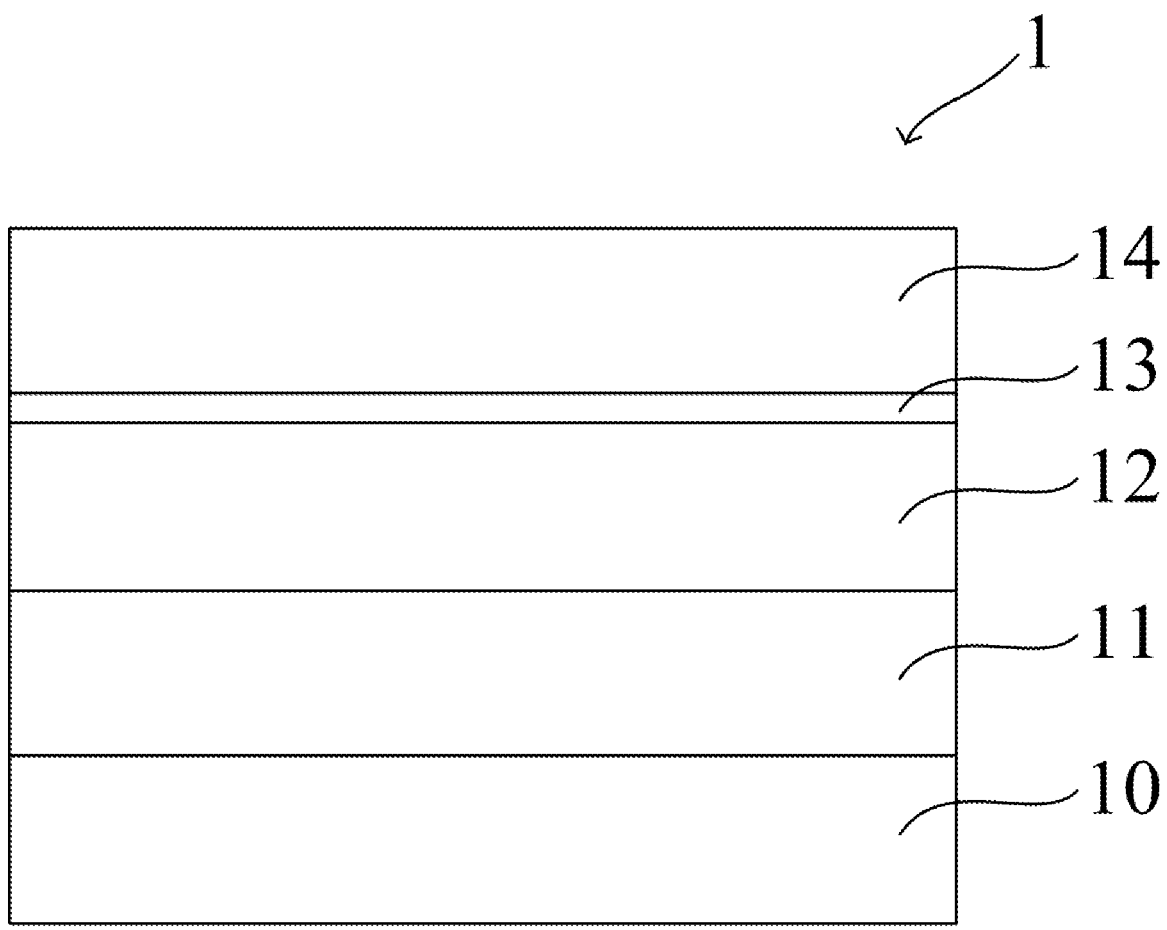
FIG. 2 is a schematic structure view showing a thermal insulating glass of Embodiment 3 of the present disclosure.

On the basis of Embodiment 2, a protective glass is provided on the protective powder layer, and the protective glass may be a commercially available ordinary glass having a thickness of 2.1 mm. A thermal insulating glass of Embodiment 3 is obtained by the above method. On the basis of the thermal insulating glass shown in FIG. 1, the thermal insulating glass of Embodiment 3 further includes a protective powder layer 13 positioned on the thermal insulating layer 12 and a protective glass 14 positioned on the protective powder layer 13 (See FIG. 2).

Comparative Embodiment 1

10 g of tetraethyl orthosilicate (TEOS) is added to 50 ml of isopropanol (IPA) and they are mixed uniformly to obtain a tetraethyl orthosilicate solution. And 3.46 g of deionized water is uniformly mixed with 0.1 N hydrochloric acid (HCl) to prepare a hydrochloric acid solution. The prepared hydrochloric acid solution is slowly added to the tetraethyl orthosilicate solution, and they are stirred for 4 hours and coated on a substrate by wet coating to obtain a sample. The sample is sintered at 550° C. for 60 minutes. 5 g of ammonium metatungstate and 1.1 g of cesium carbonate are added to 40 ml of deionized water and they are mixed uniformly to obtain a solution. Then, the pH of the solution is adjusted to 12 with ammonia water and the solution is mixed uniformly. After that, the solution is coated on the sintered substrate by dip coating and the sample is dried at 120° C. in an oven. Then, the sample is reduced in 10% (vol.) hydrogen/argon ($H_2$/Ar) at 550° C. for 60 minutes.

Scratch resistance test: the above prepared embodiment samples and the comparative sample are washed in turn by a disk brush washer, and the change value of TL (visible light transmittance) (ΔTL) before and after washing is measured. For a film layer, a larger ΔTL indicates a worse scratch resistance. Table 1 shows the comparison of ΔTLs of sample 1 of Embodiment 1 and the comparative sample 1 of Comparative Embodiment 1.

TABLE 1

| Sample | Sample 1 | Comparative sample 1 |
| --- | --- | --- |
| ΔTL | 0.1% | 16.3% |

High temperature oxidation resistance test: samples 1-3 and the comparative sample 1 (respectively corresponding to Embodiments 1-3 and Comparative Embodiment 1) are treated in turn by a glass hot bending process (650° C., 15 min), and transmission spectrums (TEs) before and after the treatment are measured. A lower TE in the infrared region indicates a better thermal insulation effect after treated by the hot bending process. The TE curves of the four samples after treated by the hot bending process are shown in FIG. 3.

Figure 3:
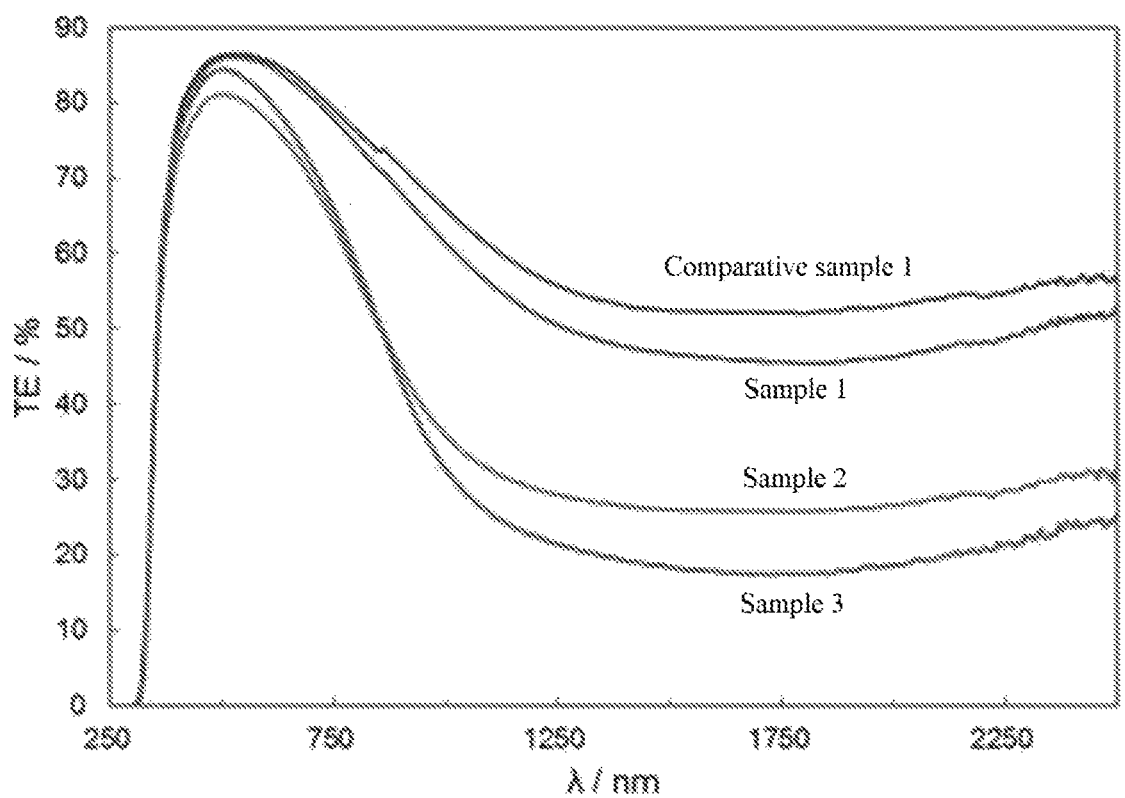
FIG. 3 shows TE curves of four samples after treated by a hot bending process in a high temperature oxidation resistance test.

As can be seen from FIG. 3, in the infrared region (wavelength λ, is greater than about 760 nm), the TEs of the samples 1-3 are lower than that of the comparison sample 1, indicating that the samples 1-3 have a better thermal insulation effect than the comparative sample 1 after treated by the hot bending treatment. Moreover, the thermal insulation effect of the sample 2 is better than that of the sample 1, and the thermal insulation effect of the sample 3 is better than that of the sample 2.

Although the specific embodiments of the present disclosure have been described above, it should be understood that those embodiments are merely illustrative and the scope of the present disclosure is defined by the appended claims. Various changes or modifications can be made to these embodiments by those skilled in the art without departing from the principle and spirit of the present disclosure, and these changes and modifications fall within the scope of the present disclosure.

The invention claimed is:

1. A thermal insulating glass comprising:
   a glass substrate; and
   a thermal insulating layer;
   wherein the thermal insulating layer comprises composite tungsten oxide and a binder, and wherein the composite tungsten oxide is represented by formula (1):

$$M_xWO_{3-y}A_y \qquad (1),$$

and wherein M is an alkali metal element or an alkaline earth metal element, W is tungsten, O is oxygen, A is a halogen element, and $0<x\leq 1$ and $0\leq y\leq 0.5$,
   and wherein the binder comprises one or more of the following components: silicon dioxide, titanium dioxide, and aluminium oxide.

2. The thermal insulating glass according to claim 1, wherein y=0.

3. The thermal insulating glass according to claim 1, wherein M is cesium.

4. The thermal insulating glass according to claim 1, wherein the thickness of the thermal insulating layer is from 50 nm to 50 μm.

5. The thermal insulating glass according to claim 4, wherein the thickness of the thermal insulating layer is from 500 nm to 5 μm.

6. The thermal insulating glass according to claim 1, wherein the weight ratio of the binder to the composite tungsten oxide in the thermal insulating layer is from 1:1 to 1:1000.

7. The thermal insulating glass according to claim 1, wherein the thermal insulating glass further comprises a barrier layer positioned between the glass substrate and the thermal insulating layer.

8. The thermal insulating glass according to claim 7, wherein the barrier layer comprises one or more of the following components: silicon dioxide, titanium dioxide, and aluminium oxide.

9. The thermal insulating glass according to claim 8, wherein the purity of components silicon dioxide, titanium dioxide, and aluminium oxide is equal to or greater than 99%.

10. The thermal insulating glass according to claim 7, wherein the dense degree of the barrier layer is equal to or greater than 90%.

11. The thermal insulating glass according to claim 7, wherein the thickness of the barrier layer is from 5 nm to 500 nm.

12. The thermal insulating glass according to claim 1, wherein the thermal insulating glass further comprises a protective powder layer positioned on the thermal insulating layer and the protective powder layer comprises one or more of the following components: carbon powder, iron powder, zinc powder, aluminum powder, and reducing salt.

13. The thermal insulating glass according to claim 12, wherein the thermal insulating glass further comprises a protective glass positioned on the protective powder layer.

14. A thermal insulating glass product comprising the thermal insulating glass according to claim 1.

15. A method for preparing the thermal insulating glass according to claim 1, comprising:
   (a) providing a glass substrate;
   (a1) optionally, providing a barrier layer on the glass substrate;
   (b) providing a thermal insulating layer on the glass substrate or on the barrier layer;
   (c) optionally, providing a protective powder layer on the thermal insulating layer;
   (d) optionally, providing a protective glass on the protective powder layer.

* * * * *